United States Patent [19]

Hoag

[11] Patent Number: 6,114,978
[45] Date of Patent: Sep. 5, 2000

[54] METHOD AND APPARATUS FOR ASSIGNMENT OF SHORTCUT KEY COMBINATIONS IN A COMPUTER SOFTWARE APPLICATION

[75] Inventor: LaVerne L. Hoag, Freehold, N.J.

[73] Assignee: Lucent Technologies Inc., Murray Hill, N.J.

[21] Appl. No.: 09/007,133

[22] Filed: Jan. 14, 1998

[51] Int. Cl.[7] .................................................. H03K 17/34
[52] U.S. Cl. ............................ 341/23; 341/22; 345/352; 345/333; 708/131; 395/701; 707/534; 706/922
[58] Field of Search .................................. 341/23, 20, 22, 341/26; 345/353, 347, 352, 333; 395/701; 707/534; 364/948.21, 948.22, DIG. 1, DIG. 2; 706/922; 708/130, 131, 160, 168

[56] References Cited

U.S. PATENT DOCUMENTS 5,287,514  2/1994  Gram ................................ 364/DIG. 2
5,530,869  6/1996  Salle ................................. 364/DIG. 1

*Primary Examiner*—Donnie L. Crosland
*Attorney, Agent, or Firm*—Gibbons, Del Deo, Dolan, Griffinger & Vecchione

[57] ABSTRACT

A method is described for the selection and assignment of keyboard access mnemonics and accelerator key combinations as part of the application software development process. After determining application functions and categories that require assignment, mnemonics and accelerators are assigned using pre-established recommendations, assignment rules and/or user assignment. If the assignments are made automatically, each function is first evaluated on the basis of usage likelihood and then prioritized before assignment begins in order to maximize the number and quality of successful assignments. In the alternative, assignments can be made on a function-by-function basis.

22 Claims, 4 Drawing Sheets

METHOD AND APPARATUS FOR ASSIGNMENT OF SHORTCUT KEY COMBINATIONS IN A COMPUTER SOFTWARE APPLICATION

BACKGROUND OF THE INVENTION

1. Field of the Invention

This invention concerns the field of interfaces for computer processing systems, and, in particular, the use of certain key combinations as "shortcuts" for implementation of defined functions.

2. Discussion of the Related Art

In many computer software applications, the software developer will assign certain key combinations as "keyboard shortcuts" which are typically used to cause the software application to implement a macro, sub-routine, object, or other defined application function. Such "keyboard shortcuts" are selected as part of the software development process. An important goal of the developer is picking keystroke combinations that are easy for users of the application to remember. To enhance recall, such keystroke combinations typically have a logical, phonetic or other association with the actual application function being called and thus are often referred to as "mnemonics". Frequently, mnemonics consist of a combination of the alternate key (ALT) and a letter key (A–Z). Examples of such mnemonics are the alternate key and letter "E" combination (ALT+E) for the "edit" menu, the alternate key and letter "F" combination (ALT+F) for the "file" menu, etc.

Keyboard shortcuts may also be implemented as "accelerators", which are similar in concept to the "mnemonics" described above and usually consist of combinations of the control, shift, alternate and letter keys, such combinations often being assigned to an application function using a logical, phonetic or other association. Note, however, that accelerators are usually assigned to application functions that are used globally, that is, used in more than one screen or possibly throughout the application. Most application functions have mnemonics. A few high usage functions also have accelerators.

In the past, software developers chose between two methods for the assignment of keyboard shortcuts (hereafter referred to as "mnemonics" and/or "accelerators") to application functions. According to the first method, a software developer generally followed his or her own intuition and/or experience to decide which key combination would be most effective. Of course some software developers are more creative than others. The typical finished software product, representing the work product of a number of developers, might therefore have a group of effectively chosen mnemonics and/or accelerators, but many poorly chosen ones.

According to the second method, a software developer might apply one or more of a group of "rules" used to a varying degree in the software industry for assigning mnemonics. Such "rules" include, for example, assigning the first letter of a function name or label to the letter portion of a mnemonic. Another rule sometimes followed is to use any consonant of the function label for a mnemonic or accelerator key assignment.

The use of either of these two methods, however, is typically a haphazard process. The rules are applied inconsistently if at all. Often the most effective rule is not used. The rules, even if they are known by the developer, will likely not be applied to all application functions. Because the assignment of mnemonics and accelerators generally holds a low priority in the hierarchy of software development activities, the process generally is not optimized. As a result, most applications typically have mnemonic and accelerator keys that may not be the most convenient or easiest to remember for application users. A substantial percentage of mnemonic and accelerator assignments could be better chosen. Indeed, it is not uncommon for duplicate mnemonics to be assigned to different functions within the same application.

SUMMARY OF THE INVENTION

Accordingly, an objective of the invention is to provide a coordinated, systematic approach to the assignment of mnemonics and accelerators. To that end, the methodology of the invention provides for a coordination in the use of prior-art mnemonic-assignment "rules" along with other assignment recommendations and in combination with user intervention. With the methodology of the invention, mnemonic and accelerator assignments are evaluated and prioritized according to the likelihood of use for each letter combination. Every label is evaluated and an order of assignment priority established. Thus established, such prioritization of assignments permits an optimization of the total number and quality of possible assignments.

Further, assignment "categories" are established which enhance the flexibility and effectiveness of assignments. Determination of whether any potential assignment would duplicate a previously made assignment is an additional feature of the inventive methodology.

Due to the capabilities and features of the invention, the number of mnemonic/accelerator assignments realistically available for use by an application developer far exceeds the number of individual evaluations and assignments possible using previously known methods. Moreover, with the method of the invention, a very significant reduction is realized in the required time for making mnemonic/accelerator assignments—a reduction estimated to be of the order of 70 to 80%. It follows that, with the methodology of the invention, development costs are reduced concurrently with an improvement in the quality of assignments.

DETAILED DESCRIPTION OF THE INVENTION

As described in the Background section, prior efforts to assign mnemonics and accelerators have been lacking in any systematic approach, and the results have been highly varied in terms of either efficiency or efficacy. To address that problem, a coordinated, systematic methodology for such mnemonic/accelerator assignment has been developed by the inventor and is disclosed hereafter. From a global perspective, the essential steps of the methodology of the invention can be described as follows:

Initially, a file is developed of software functions for which a mnemonic or accelerator assignment is desired; this listing of such software functions may be prepared by the software development team, or through other known means.

To the extent considered desirable by the software developers, such software functions may be grouped into categories, such as file functions or edit functions.

A prioritization of functions/categories is made in relation to expected ease of finding a suitable mnemonic/accelerator and/or the relative likelihood of recurrence of use for the function/category; after priorities have been determined, assignments are normally made in decreasing order of assignment difficulty, thereby maximizing the number of assignments able to be made successfully.

Although a primary operating mode for the method of the invention is the automatic assignment of mnemonics/accelerators for a designated set of functions—according to a hierarchical assignment regime, a function-by-function assignment mode is also provided whereby the user is able to assign mnemonics/accelerators on a function-by-function basis, pursuant to various assignment procedures available to the user.

In the automatic assignment mode, an initial effort is made to assign the mnemonic/accelerator for a given function or category by selection from a predetermined set of "recommended" mnemonics/accelerators based generally on historic mnemonic-function association.

If an assignment is not made from such "recommendations", a set of generalized assignment "rules" is applied, in a predetermined hierarchical order, until an assignment is made (or if no assignment is found under these rules, the user is offered the option to make a manual assignment).

At user option, once an assignment has been determined in the automatic assignment mode, an accept/reject choice is provided to the user; rejection would cause the assignment process to revert to the manual assignment mode.

An accepted assignment is recorded in a database against which subsequent assignments are checked for duplication; such database is also available for use in checking for duplication in the case of manual assignment.

I. Description of Methodology of the Invention

Figure 1:
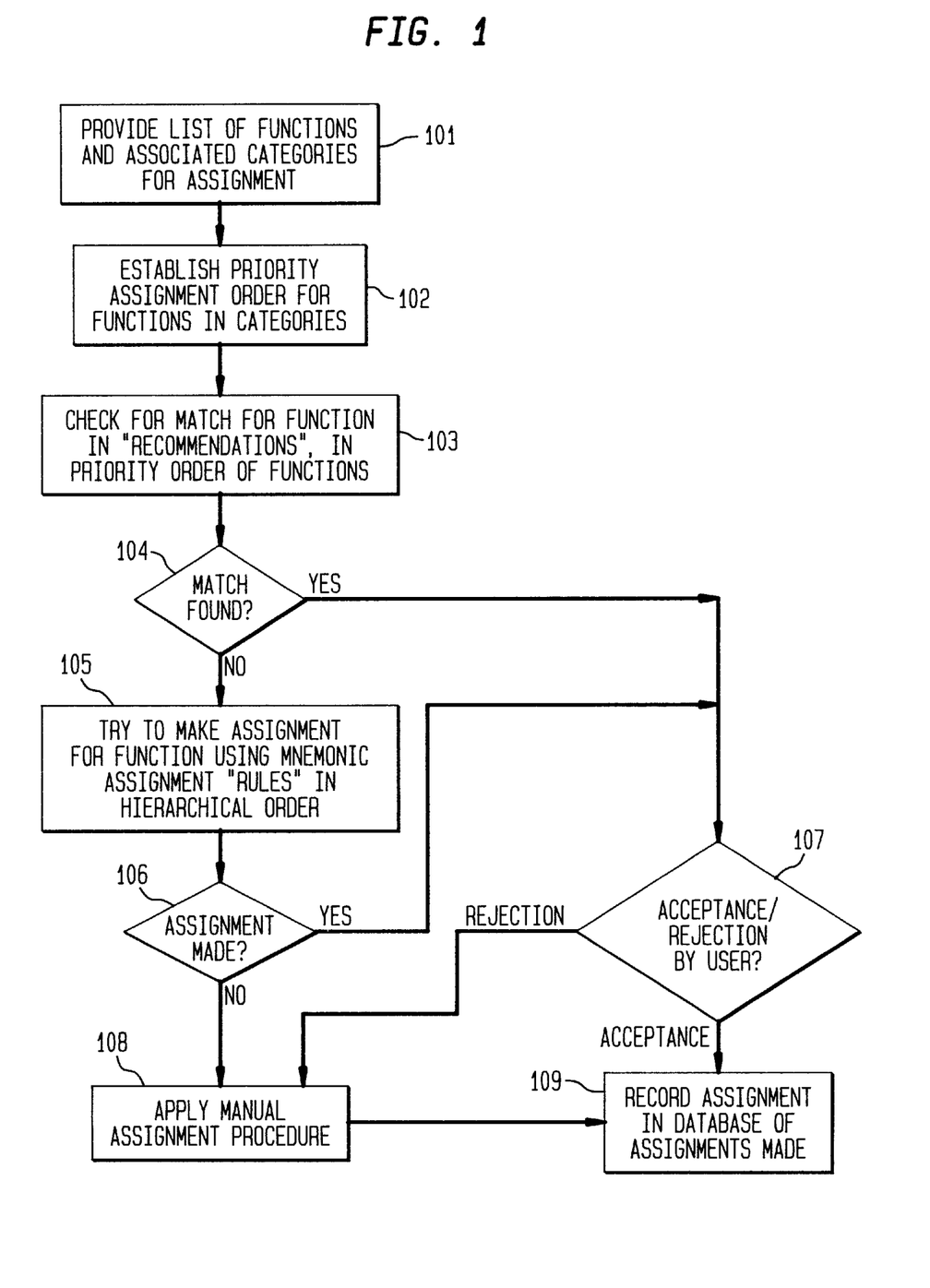
FIG. 1 shows a flow chart for mnemonic assignment according to the methodology of the invention.

In considering the specific manner in which the invention operates, it will be convenient to describe the steps followed in carrying out the methodology of the invention in terms of a flow chart, such as is depicted in FIG. 1. The first step in the process of the invention (101 in the figure) involves the provision of a list, or database, of functions for a given application, as to which functions, it is desired to assign mnemonics and/or accelerators. As previously indicated, this "data gathering" activity may be accomplished in a number of ways, and any known way for so forming such a function assignment list is intended to be within the scope of the invention.

In the automatic assignment mode, the next step in the assignment process carried out by the method of the invention is a prioritization of the functions within categories for which mnemonics/accelerators are sought—Step 102. To establish that assignment priority, a score is calculated for each function label and stored in a memory. Those scores are then used to establish the order for the assignment of mnemonics and accelerators. Scoring is conducted according to the following algorithm:

1. If function is in the list of Recommended Assignments, then set score equal to 0, otherwise set the score equal to 1.

2. For functions not in the list of Recommended Assignments, analyze the function label character-by-character. If a character has already appeared in the label, add 0 to the score and go to next character.

3. If a character is A, C, F, H, N, O, P, R, S, or T, then add 1 to the score and go to the next character.

4. If a character is D, E, G, L, M, V, W, or X, then add 2 to the score and go to next character.

5. If a character is J, K, Q, U, Y, or Z, then add 5 to the score and go to the next character.

After priorities have been determined for all unassigned functions, assignment of mnemonic/accelerators proceeds (as described below) in the order of increasing score. Thus, if the function has a letter that is used very little, assignments will tend to be made later. In effect, that letter is likely to be available for assignment. On the other hand, if a function label is made up of all letters that are used frequently, that assignment will be made earlier. If two or more functions have the same score, they are assigned mnemonics in first-in-first-out order.

As will be apparent, in the case of the user choosing to make assignments on a function-by-function basis, the user will make its own determination of the priority in which mnemonics are assigned to functions, and this step will be skipped when operating in that mode.

Following prioritization, each of the functions under consideration is initially evaluated to determine whether that function is contained in the list of Recommended Assignments—Step 103. The set of mnemonic/accelerator assignments constituting such "Recommendations" may be derived from an analysis of historical patterns of mnemonic/accelerator assignments, relative to given functions. Those assignments would then be cataloged in a manner to permit the mnemonic/accelerator associated historically with a particular function (or category) to be selected for assignment to the comparable function under consideration. Such "Recommendations" may also include mnemonic-function associations found in established "standards" (which are thus believed to be familiar to application software developers). A list of 140 such recommended mnemonics/accelerators is shown in Table I below. Those Recommendations may be considered as being part of the preferred embodiment of the invention. It should however be recognized that the methodology of the invention is not limited to this, or any particular set of "Recommendations", and that those skilled in the art will be able to formulate many different such sets of "recommended" mnemonics/accelerators. Note that the Recommendations list for the preferred embodiment includes both recommendations for complete function labels and recommendations for single words that are part of a label.

In developing the set of "recommendations" of Table I, the inventor made over 11,000 observations of mnemonics and accelerators used in 39 popular software packages. These observations were supplemented by the "standards" provided by the Microsoft UI Design Guide recommendations for Windows 3.x® and Windows 95®, and the OSF/Motif Design Guide. (The Motif organization has established a graphical user interface for the UNIX operating system and makes recommendations for mnemonic access keys and accelerators that should be used as part of that user interface.) Examples of such recommendations are "F" for file functions and "E" for edit functions.

TABLE I

"Recommended" Assignments

| Function | Category | Mnemonic | Accelerator |
|---|---|---|---|
| File | Main Window | F | |
| Edit | Main Window | E | |
| View | Main Window | V | |
| Option | Main Window | O | |
| Window | Main Window | W | |
| Help | Main Window | H | |
| Save As | File | A | |
| Close | File | C | |
| Open | File | O | ctrl + O |
| New | File | N | ctrl + N |
| Print | File | P | ctrl + P |
| Print(er) Setup | File | R | |
| Save | File | S | ctrl + S |
| Exit | File | X | |
| Copy | Edit | C | ctrl + C |
| Find | Edit | F | ctrl + F |
| Links | Edit | K | |
| Paste | Edit | P | ctrl + V |
| Paste Special | Edit | | |
| Cut | Edit | T | ctrl + X |
| Undo | Edit | U | ctrl + Z |
| About | Help | A | |
| Contents | Help | C | |
| How to Use Help | Help | H | |
| Help Topics | Help | H | |
| How do I | Help | H | |
| Search | Help | S | |
| Always on Top | Help | T | |
| Arrange | Window | A | |
| Cascade | Window | C | |
| Tile | Window | T | |
| All | Any | A | |
| Add | Any | A | |
| Browse | Any | B | |
| Bottom | Any | B | |
| Back | Any | B | |
| Copy | Any | C | |
| Copies | Any | C | |
| Directory | Any | D | |
| Directories | Any | D | |
| Display | Any | D | |
| Default | Any | D | |
| Delete | Any | D | |
| Edit | Any | E | |
| File | Any | F | |
| Files | Any | F | |
| Find | Any | F | |
| Font | Any | F | |
| Fonts | Any | F | |
| Go | Any | G | |
| Help | Any | H | |
| Left | Any | L | |
| Landscape | Any | L | |
| Number | Any | N | |
| New | Any | N | |
| Name | Any | N | |
| Options | Any | O | |
| Page | Any | P | |
| Pages | Any | P | |
| Print | Any | P | |
| Printer | Any | P | |
| Reset | Any | R | |
| Remove | Any | R | |
| Right | Any | R | |
| Portrait | Any | R | |
| Row | Any | R | |
| Rows | Any | R | |
| Send | Any | S | |
| Setup | Any | S | |
| Size | Any | Z | |
| Select | Any | S | |
| Search | Any | S | |
| Show | Any | S | |
| Save | Any | S | |
| Set | Any | S | |
| List | Any | T | |
| Type | Any | T | |
| Top | Any | T | |
| Table | Any | T | |
| Use | Any | U | |
| Drives | Any | V | |
| Vertical | Any | V | |
| Always on Top | Any | T | |
| Apply | Any | A | |
| Back | Any | B | |
| Browse | Any | B | |
| Copy Here | Any | C | |
| Create Shortcut | Any | S | |
| Create Shrtct Here | Any | S | |
| Delete | Any | D | |
| Explore | Any | E | |
| Find | Any | F | |
| Help | Any | H | |
| Help Topic | Any | T | |
| Hide | Any | H | |
| Insert | Any | I | |
| Insert Object | Any | O | |
| Link Here | Any | L | |
| Maximize | Any | X | |
| Minimize | Any | N | |
| Move | Any | M | |
| Move Here | Any | M | |
| Next | Any | N | |
| No | Any | N | |
| Open With | Any | W | |
| Page Setup | Any | U | |
| Paste Link | Any | L | |
| Paste Shortcut | Any | S | |
| Paste Special | Any | S | |
| Pause | Any | P | |
| Play | Any | P | |
| Print Here | Any | P | |
| Properties | Any | R | |
| Quick View | Any | Q | |
| Redo | Any | R | |
| Repeat | Any | R | |
| Restore | Any | R | |
| Retry | Any | R | |
| Resume | Any | R | |
| Run | Any | R | |
| Select All | Any | A | |
| Send To | Any | N | |
| Show | Any | S | |
| Size | Any | S | |
| Split | Any | P | |
| Stop | Any | S | |
| View | Any | V | |
| What's This? | Any | W | |
| Window | Any | W | |
| Yes | Any | Y | |

The process of the invention then comes to a decision step 104 for a determination as to whether a mnemonic was found in the "Recommendations" list for the function under consideration. If so, the process proceeds to provide the user an opportunity to accept or reject the "recommended" assignment (Step 107). Note, however, that, in practice, when operating in the automatic assignment mode, all functions subject to automatic assignment will have an assignment made (if such an assignment is possible) by Step 103 or Step 105 prior to the user review step, at which point the user would be able to accept or reject each such assignment.

If, at decision step 104, it is determined that there is no match in the "Recommendations" list for the function under consideration, the process moves to a further evaluation step 105 where an attempt is made to find a suitable mnemonic for the function through application, in a defined hierarchical order, of a set of generalized assignment "rules". Those generalized assignment rules represent a derivation of a set of such rules from human factors literature and practices with regard to graphical user interface design. For the preferred embodiment, the inventor has codified five (5) such generalized "rules" used by software developers for assignment of mnemonics/accelerators to application functions—such particular rules being set forth in the appropriate hierarchical order of application in FIG. 2 and designated by reference designators 202–206, although it will be understood that other formulations of such rules, and greater or lessor numbers thereof, will be within the contemplation of the method of the invention.

After application of the assignment "rules" of step 105, a determination is made at decision step 106 as to whether an assignment was made from those rules for the function under consideration. If such an assignment was made, the process continues to the step of acceptance/rejection of the assignment by the user (107). Acceptance by the user causes the assignment to be recorded in a database of assignments for that application (Step 109), against which future assignments will be checked to avoid duplication. Note, however, that, as described above for assignments made by Step 103, when operating in the automatic assignment mode, all assignments made by Step 105 are made prior to the beginning of user review, and accordingly, such assignments (as with assignments automatically made by Step 103) are provisionally recorded in the assignments database to avoid duplication by subsequent "automatic" assignments. In the event that either no assignment was made by Step 105 or that the assignment made is rejected by the user, the process continues to a manual assignment step 108, where the user will make a manual determination of the mnemonic to be assigned for that function. After any such manual assignment, that assignment is also recorded in the database of assignments made (Step 109).

II. Illustrative Application of Methodology of the Invention

The methodology of the invention may readily be implemented as a software application running on a stored program computer, which may be a "personal computer", a workstation, or a larger computer system. Such a computer will normally include a central processing unit, internal memory, data storage facility or facilities (including removable storage media), various input/output devices, including keyboard input device, "mouse", display unit and hard copy output device, along with an operating system which controls the computer's operation. Data for use by such an application may be either input via keyboard or entered into the system via removable storage medium such as a diskette or CD ROM disk. Display of data and information is accomplished via a display monitor and/or hard copy output device. For permanent storage, data files can be stored on any of a variety of data storage facilities such as a hard disk drive, removable disk, tape drive, etc. Control features for a computer system running such an application program would be similar to those generally known in the art for an operating system providing a graphical user interface—e.g., buttons, menu bars, button bars, etc. The operating system would provide the typical file management functions and editing functions which are common to this type of system. Most commands, actions, system functions and features may be enacted by several different methods, such as clicking or double-clicking with a mouse on menu bars, buttons, etc. to enact them, or by entering commands/identifying menu options from a keyboard.

For the illustrative embodiment described hereafter, the application program for implementation of the methodology of the invention (which has been designated as "GULLF Keyboard Access Tool") is described in terms of a program running under the MS Windows® operating system and its associated graphical user interface. It should, however, be understood that such an application program is in no sense limited to that operating environment. Indeed the methodology of the invention could readily be implemented in an application running under any graphical user interface and environment known to practitioners in the art (or even in a non-GUI environment with some loss of convenience). It is also within the intended scope of the invention for such an application to be programmed and compiled in a variety of languages and for any platform.

Figure 3:
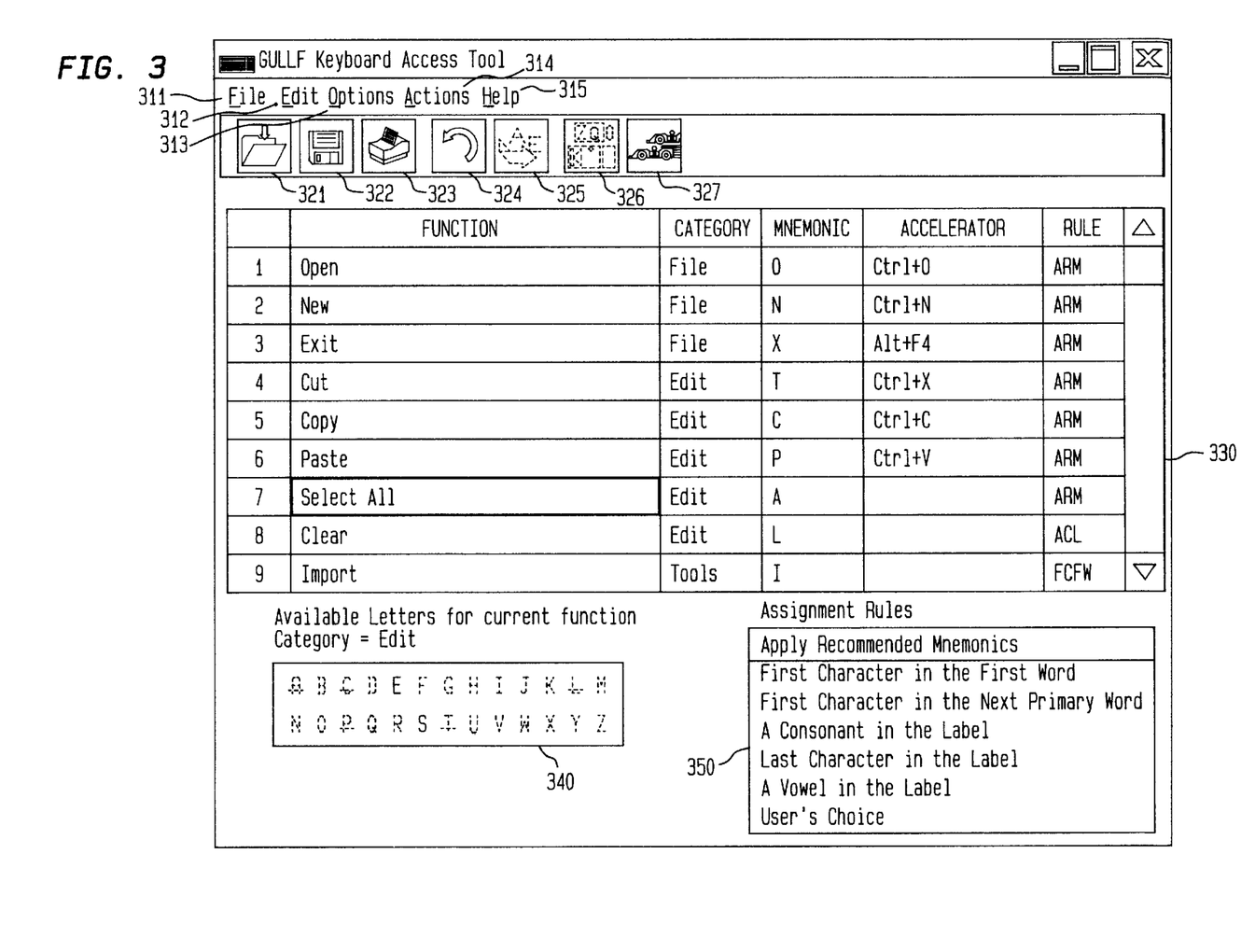
FIG. 3 shows a typical screen layout for a main screen in an illustrative application of the methodology of the invention.

With the illustrative embodiment described herein, the application program implementing the method of the invention will be controlled from the main screen of the user interface. An exemplary depiction of the layout for such a main screen is shown in FIG. 3. As will be seen in the figure, this exemplary screen layout is based on the Windows GUI, having a set of drop-down menus (311–315) arrayed across a top portion of the screen. Immediately below that set of menus, a tool bar is provided which includes, as a set of "buttons" (321–327), a subset of the most important and frequently used application functions, so that the user has access to them at a glance. The specific functions associated with these menus and buttons are described below.

Displayed in a main portion of the screen ("window" 330) is a listing of functions subject to assignment, along with the category, mnemonic, accelerator and assignment basis for each such function, as applicable. Below that functional listing are windows displaying "letters" available for assignment to the current function (window 340) and a listing of all of the assignment bases supported by the program (window 350) according to the order of priority for use. In the "letters available" window 340, all of the letters of the alphabet are displayed with the still-available letters highlighted. The letters displayed change according to which function category is in use. Note that of the letters shown dimmed in window 340, those with a strike-through symbol appear in the selected function but have previously been assigned, while the remaining dimmed letters do not appear in the selected function.

The first two drop-down menus in this illustrative embodiment, "File" 311 and "Edit" 312 provide functions and sub-functions that are generally known in the software art. The first menu, "File" provides file related functions such as "New", "Open", "Save", "Save As", "Print Table", and "Exit". The "Edit" menu provides typical edit features such as "Cut", "Copy", "Paste", "Delete Row", and "Insert Row."

The third of the drop-down menus, "Options" 313, permits a selection among a group of functions and sub-functions directed specifically to the operation of the application program. {Note that, as with GUIs generally, selection of a given menu item may be accomplished in several ways, including "clicking" on the selected item with a mouse, highlighting the selected item using keyboard cursor keys and then pressing "enter", or though use of a mnemonic.}

The first "Options" menu function, "Assign Accelerator after Mnemonic", provides the user an option to assign an accelerator immediately after assignment of each mnemonic. Selection of this menu item, which will typically be applied in the "function-by-function" assignment mode (described below), will cause an accelerator assignment to be made (or the user prompted to make an assignment if one is not found in the "Recommendations" list for that function)

after every corresponding mnemonic assignment. Otherwise, the user will need to make an accelerator assignment for that function (if one is needed) at a later time.

In the event that the user assigns a mnemonic and/or accelerator by a method other than automatic assignment—i.e., manual or "function-by-function", the user may cause the assigned mnemonic and/or accelerator to be automatically checked for possible conflicts with the "Recommendations" by selection of the "Options" menu function "Check Recommended Mnemonic/Accelerators." When this item has been selected, the application carries out a check of the list of "Recommendations" for conflicts. It looks for two types of conflicts:

1) If the function is found in the list, a check is made to see if the assigned mnemonic and/or accelerator correspond to the one(s) recommended for that function. If they do not, a message appears to inform the user.
2) If the function is not found in the list, the application checks to see if the assigned mnemonic and/or accelerator is used by another function in the list. If a conflict exists, a message is displayed to inform the user. The user can then elect to change or keep the assignment.

An "Options" menu function designated "Animate Auto Assign Icon" allows the user to determine whether an icon displayed on the Auto Assign button 326 will include an animation feature. If selected, this feature causes the icon to display animation whenever any unassigned functions remain in the table. Since the table typically has more functions than can be displayed in the functions list window 330 at any one time, this feature eliminates the need to scroll through all of the functions in the database in order to determine if any functions remain unassigned. Of course, deselection of this menu item will cause the animation to be turned off when it had previously been turned on.

Other options in the "Options" menu include "Show Table Lines" (for the table displayed in window 330), "Replace Icons (of toolbar buttons) with Text", "Save Above Options" (make a given set of options a default set), and "Data Entry Mode" (customization of order of accessing fields in table of window 330). These are typical of features that are well known in the art.

An "Actions" menu 314 presents a number of command menu choices which control the operation of the program. One such choice, designated "Make Assignments Automatically", causes the program to assign all then-unassigned functions without further user intervention, according to the automatic assignment procedure of the methodology of the invention. Another Actions-menu choice, "Put Mnemonic & Accelerator Back", may be exercised after any mnemonic and/or accelerator selection to reverse the effect of an assignment. In using this menu function, the user first selects a row and then selects this menu choice, thereby causing the application program to remove the mnemonic and accelerator from the row, placing them back into the appropriate list(s) so that they can be used again.

An Actions menu function called "Open Accelerator List", can be used to display a list of available accelerators at any time. An accelerator can then be assigned by double-clicking on any key combination from the list of available key combinations. Alternatively, accelerator assignments can be made by typing the desired key combination. The assignment is automatically checked against the accelerator list. If the accelerator is not found in the list as already having been selected, a message will be displayed asking the user if he/she wants to use it. If the user assents, the accelerator is assigned and the accelerator list is updated. If not, it is removed.

An Actions menu choice called "Assign Next Mnemonic Following Rule" may be used for assignment rules that can make more than one assignment. Those rules include 1) "First Character of the Next Primary Word", 2) "A Consonant in the Label" and 3) "A Vowel in the Label". Selecting this option causes the program to choose the next character of the function label that complies with the rule—thereby permitting the user to iteratively apply a rule until a desired mnemonic is found. Any previously assigned characters are put back into the appropriate list as again being available.

The Actions menu also includes commands to import and export data. After selecting the import function, the user can select which fields are to be imported into the data table. These can include the function name, category, mnemonic, accelerator and rule used. The user is also given the option to enter a file name for the file that is to be imported and to indicate what separator will be used to separate the data table fields. The same options are provided with respect to exporting a data table.

The final option of the Actions menu for the illustrated embodiment is "Show Recommended Mnemonics/Accelerators." Selection of this menu function opens a window containing the list of the 140 recommended mnemonics and accelerators for viewing.

The Help menu 315 is arranged in a conventional manner and its organization and structure will be apparent to those skilled in the software arts.

In the Toolbar displayed below the Pull-Down Menus, Buttons 321, 322 & 323 which represent respectively "Open File", "Save" and "Print", are conventional insofar as the function to be carried out is concerned and need not be described further. Button 324 is designated "Put Back", and the function carried out corresponds to the action of the "Put Mnemonic & Accelerator Back" item of the Actions menu as described above. Button 325 is designated "Next Mnemonic", and the function carried out corresponds to the action of the "Assign Next Mnemonic Following Rule" item of the Actions menu as described above. Button 326, the "Auto Assign" button described above, not only includes an icon which can be animated to show that at least one function in the database remains unassigned, but its application will cause the "Make Assignments Automatically" function of the Actions menu as described above. Finally, Button 327 is designated "Open Accelerator List", and the function carried out corresponds to the action of the "Open Accelerator List" function of the Actions menu as described above.

Figure 4:
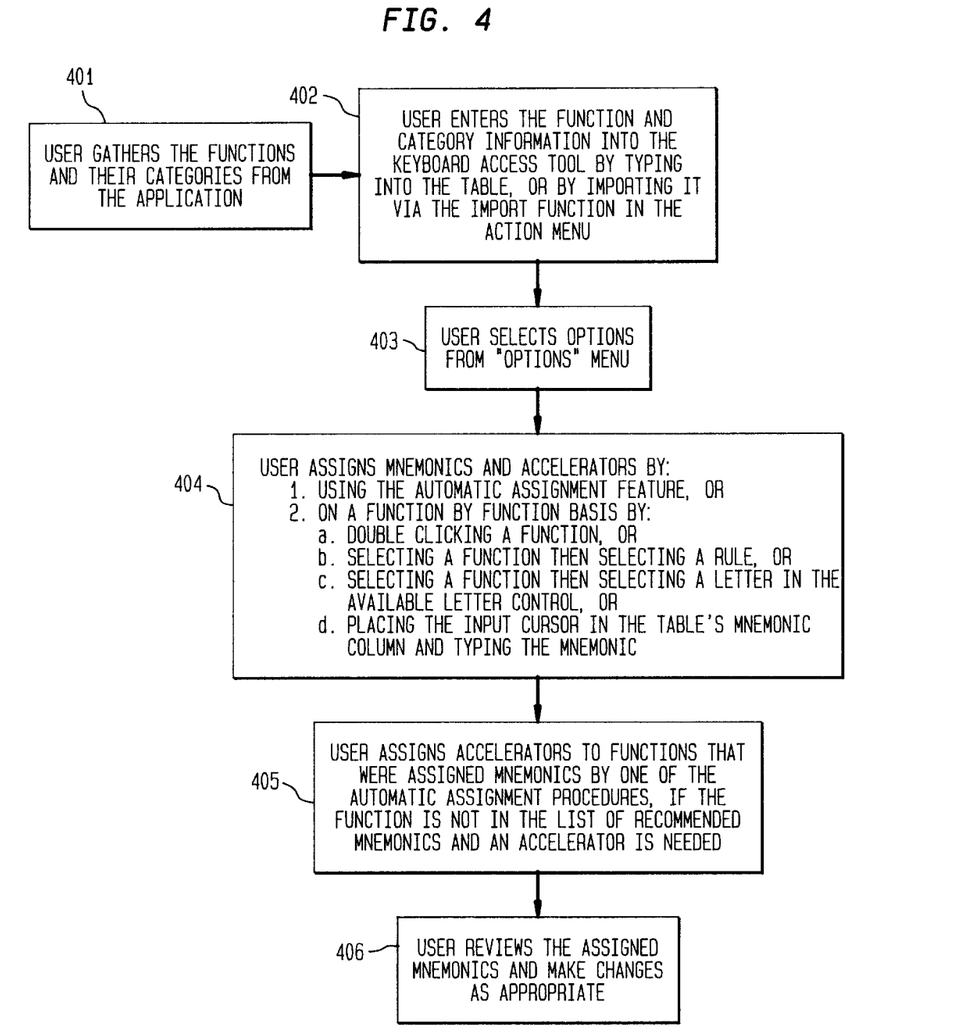
FIG. 4 shows schematically the steps carried out in such an illustrative application of the methodology of the invention.

The manner in which the illustrative application program carries out the methodology of the invention is illustrated schematically in FIG. 4. As can be seen in the figure, that process begins with the user collecting a list of functions, and any associated categories, from the application under consideration (Step 401). The user then enters the function and category information into the Keyboard Access Tool program by typing the data via keyboard into a table, or by importing it via the Import function of the Actions menu (Step 402). As previously explained, each screen and/or menu of a target software application would ordinarily be represented as a separate category (although additional or other categories may, of course, also be used). For example, all of the functions of the application which are "File" menu related functions would be treated as one category. Similarly, the functions of the "Edit" menu would be treated as a separate category.

Once function and category data have been inputted or imported, the next step is for the user to select program operation options from the Options menu as appropriate to the assignment objective at hand (Step 403). The user then proceeds to the assignment step, either causing a global assignment of the mnemonics on an automatic basis—e.g., by clicking on the "Auto Assign" button—or approaching the assignment process on a function-by-function basis (Step 404).

Figure 2:
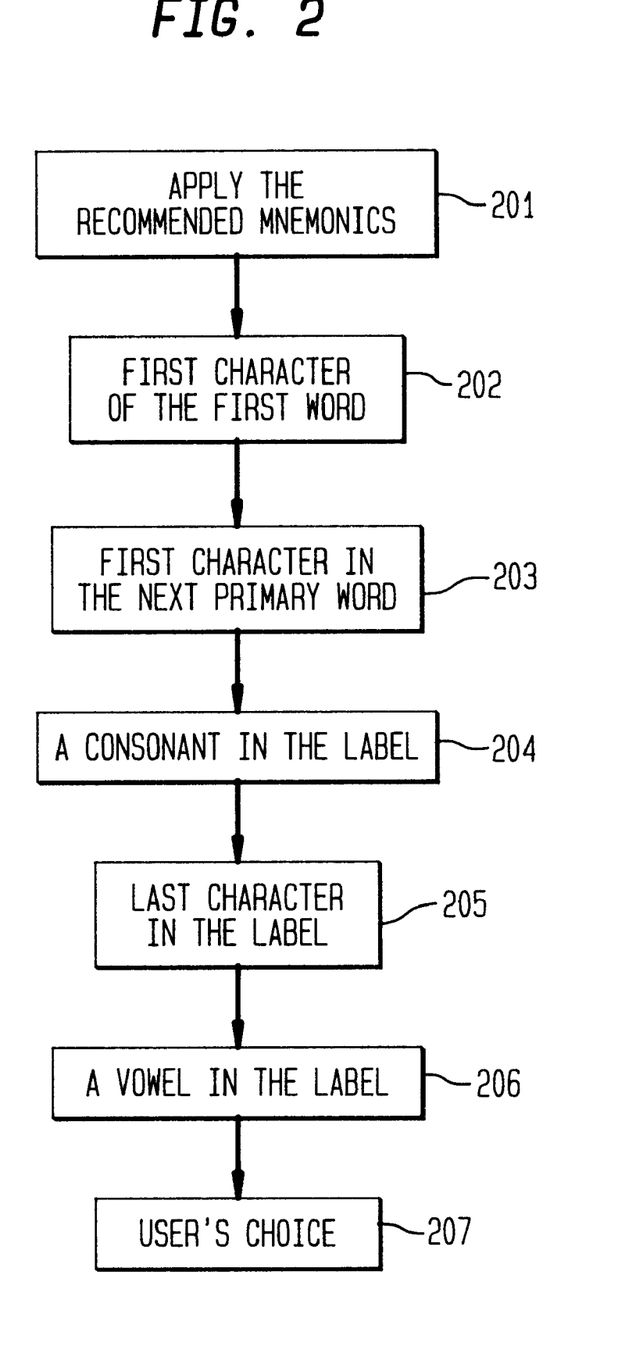
FIG. 2 shows a chart of assignment bases according to the methodology of the invention in order of application.

For the case of automatic assignment, once the functions to be assigned have been prioritized as to assignment order by the application program, any of six assignment bases may be applied—such assignment bases being depicted in hierarchical order of application in FIG. 2. [Note that User Choice, which is also depicted in FIG. 2, is equivalent to the Manual Assignment described earlier and is accordingly not part of the automatic assignment process.] Each of, the application functions, in priority order, is first checked against the list of "Recommendations" 201 to see if an appropriate mnemonic can be found there. Failing an appropriate assignment match at the "Recommendations" step, the five "rules" 202–206 are then applied in the order shown: "First Character of the First Word" 202, "First Character in the Next Primary Word" 203, "A Consonant in the Label" 204, "Last Character in the Label" 205, and "A Vowel in the Label" 206. Each of these rules is applied in a straightforward manner. For example, if the function being processed is "Save As", the system initially selects "S" for the mnemonic because it is the first character of the first word of the function (202). However, since the "S" mnemonic typically would already have been chosen for assignment to the "Save" function—a check for such potential duplication being made against the database of previously assigned mnemonics for each such "trial" assignment, the letter "A" would be chosen because it is the first character in the next primary word (203). In actual practice the "Save As" function would not require application of any of rules 202–206 since it would have been found in the list of "Recommendations" 201—at least in the illustrated embodiment.

While an attempt is made to assign a mnemonic or accelerator for all identified functions/categories of the application under consideration using the assignment bases shown at 201–206, there may be occasions when a mnemonic cannot be established for certain functions using those automatic assignment bases. In that case, the assignment must be made pursuant to the final assignment basis, User Choice 207.

For the case of a user wishing to interface with the methodology of the invention on a function-by-function basis, a variety of options are available as indicated by substeps 2a–2d of step 404. The option of substep 2a enables the user to make an assignment by double-clicking with a mouse-like input device on the function (as displayed in a function cell of the table shown in window 330) to be assigned. The assignment bases depicted in FIG. 2 are thereupon applied to that function, one at a time, in the order shown, 201–206, until a successful assignment is made. The mnemonics are assigned first, but if an "Assign Accelerator after Mnemonic" option has been selected in the "Options" menu, an accelerator will also be assigned. If there was no recommended accelerator, the Available Accelerator list is opened so that the user can select an accelerator.

Another function-by-function mnemonic assignment option, as depicted by substep 2b, is to select a function, then select an assignment basis (from the set depicted in FIG. 2) to be used for assignment. The function is chosen by clicking on the function to be assigned. At that point the desired assignment basis can be selected by clicking on any of the six assignment bases which have been described herein. Note that those assignment bases will be listed in the "Assignment Rules" window 350.

A third function-by-function assignment option, shown at substep 2c, is to select a function then select a letter from the Available Letters list. As previously indicated, the Available Letters list, which includes all letters available for assignment within the category of the function being assigned, will be displayed in window 340. To assign a letter as a mnemonic, the user clicks on the desired letter. After any selection, the list is updated for future reference. As a result, the user is prevented from making duplicate assignments of mnemonics.

Finally, as shown at substep 2d, function-by-function assignment can also be carried out by selecting a function, then either typing or "pasting" a mnemonic chosen by the user into the mnemonic field associated with that function (in the table of window 330).

Where a mnemonic has been assigned to a function using the automatic procedure, and the function also requires an assignment of an accelerator, if the accelerator for that function is not in the Recommendations list, assignment of that accelerator will revert to a manual assignment by the inventor, as shown in Step 405 of FIG. 4.

Upon completion of the steps of the automatic assignment procedure for function so assigned, the user is able to review those assignments by causing them to be displayed on a display device associated with the computer used for carrying out the assignment process. With such review, the user is provided the capability to override or change any of those selections, as shown at Step 406 of FIG. 4. Note that any function for which an appropriate mnemonic/accelerator could not be assigned by the automatic mode of the program will require a manual assignment by the user.

Due to the limited number of unique letter combinations available for use in any application, it may be necessary or desirable to assign a particular keyboard letter to more than one application function. In that case, the use of separate "categories" allows any keyboard letter to be assigned in an effective manner to multiple functions. Whenever any application function is assigned it is also associated with a particular "category". A "category" is generally defined as being equivalent to a particular screen or group of menu options, but it could also be made equivalent to other software developer defined groupings. If the keyboard letter is assigned to more than one function it will be associated with each different category. For example, the "M" key may be associated with two different "categories" such as "File" and "Edit". Within the "File" category the "M" key might be assigned to the "Summary" function but within the "Edit" category assigned to the "Move" function.

Conclusion

A mnemonic/accelerator assignment methodology has been described that provides significant improvements over prior-art assignment methods. Although the present embodiment of the invention has been described in detail, it should be understood that various changes, alterations and substitutions can be made therein without departing from the spirit and scope of the invention as defined by the amended claims.

What is claimed is:

1. A method for assignment of keyboard shortcuts during software application development, said keyboard shortcuts being operable to cause identified functions in said software application to be implemented, and being in the nature of two or more keys accessible from such a keyboard, said method comprising the steps of:

providing a set of assignment rules which may be applied to ones of said identified functions for causing a keyboard shortcut to be assigned;

selecting a set of said identified functions and establishing a priority order thereof for assignment of said keyboard shortcuts thereto;

applying said assignment rules in a predetermined order to a highest priority one of said selected set of identified functions not having a keyboard shortcut assignment until a keyboard shortcut assignment satisfying a given criterion is found; and iteratively repeating said applying step in priority order for remaining ones of said selected set of said identified functions.

2. The keyboard-shortcut assignment method of claim 1 wherein an initial assignment rule applied to a given one of said selected set of identified functions by said applying step includes a comparison of said given one of said selected set of identified functions with a set of recommended assignments, said set of recommended assignments being based, at least in part, on an historical linkage between a given keyboard shortcut and a given software application function, and upon finding a match for said given one of said selected set of identified functions with a function in said set of recommended assignments, selecting a keyboard shortcut associated with said matched function.

3. The keyboard-shortcut assignment method of claim 2, wherein said assignment rules applied subsequent to said set of recommended assignments include a set of assignment rules which determine a keyboard shortcut for said given one of said identified functions as a combination of a CTRL, ALT or SHIFT key, on one hand, and a letter appearing in a label of said given one of said identified functions, on the other hand.

4. The keyboard-shortcut assignment method of claim 3 wherein said assignment rules operate to assign a keyboard shortcut comprising a combination of said ALT key and a letter established by an ordered application, concluded upon finding an assignment satisfying a given criterion, of the following criteria:

first character of first word of function label;
first character in next primary word of function label;
any consonant in function label;
last character in function label;
a vowel in function label.

5. The keyboard-shortcut assignment method of claim 1 wherein said step of iteratively repeating said applying step is carried out on a substantially automated basis.

6. The keyboard-shortcut assignment method of claim 1 wherein said keyboard shortcut assignments are automatically written into application source code for said software application.

7. The keyboard-shortcut assignment method of claim 1 wherein said priority order is established in an inverse relationship to a likelihood of successfully finding an acceptable keyboard shortcut assignment for a given function.

8. The keyboard-shortcut assignment method of claim 1 wherein said given criterion for acceptance of a keyboard shortcut assignment includes user review of a proposed assignment.

9. The keyboard-shortcut assignment method of claim 1 further including an establishment of a database of keyboard shortcuts previously made for said identified functions in said software application, and wherein each further assignment of a keyboard shortcut to a one of said identified functions is checked against said database for repeated usage of a keyboard shortcut.

10. The keyboard-shortcut assignment method of claim 1 wherein a failure of said applying step to find an acceptable keyboard shortcut assignment for said given one of said identified functions results in a default to a user-selection process for that function.

11. The keyboard-shortcut assignment method of claim 1 wherein said identified functions are obtained by extracting said functions from source code for said software application.

12. The keyboard-shortcut assignment method of claim 11 wherein said extraction of said identified functions is carried out by analyzing operation of a compiled, running software application program.

13. A software application established to carry out the keyboard shortcut assignment method of claim 1.

14. A system for assignment of keyboard shortcuts during software application development, said keyboard shortcuts being operable to cause identified functions in said software application to be implemented, and being in the nature of two or more characters accessible from such a keyboard, said system comprising:

means for providing a file of a selected set of said identified functions, wherein said selected set of identified functions is arranged in a priority order for assignment of said keyboard shortcuts thereto;

means for applying, in a predetermined order, a set of assignment rules, which may be applied to ones of said identified functions for causing a keyboard shortcut to be assigned, to a highest priority one of said selected set of identified functions not having a keyboard shortcut assignment until a keyboard shortcut assignment satisfying a given criterion is found; and means for iteratively repeating, in priority order, an application of said means for applying for—remaining ones of said selected set of said identified functions.

15. The assignment system of claim 14 wherein, in an application of an initial one of said assignment rules, said means for applying operates to compare a given one of said selected set of identified functions with a set of recommended assignments, said set of recommended assignments being based, at least in part, on an historical linkage between a given keyboard shortcut and a given software application function, and upon finding a match for said given one of said selected set of identified functions with a function in said set of recommended assignments, operates to select a keyboard shortcut associated with said matched function.

16. The assignment system of claim 15 wherein said assignment rules applied by said means for applying subsequent to application of said set of recommended assignments include a set of assignment rules which determine a keyboard shortcut for said given one of said identified functions as a combination of a CTRL, ALT or SHIFT key, on one hand, and a character key, on the other hand.

17. The assignment system of claim 16 wherein said assignment rules operate to assign a keyboard shortcut comprising a combination of said ALT key and a character key established by an ordered application, concluded upon finding an assignment satisfying a given criterion, of the following rules:

first character of first word of function label;
first character in next primary word of function label;
any consonant in function label;
last character in function label;
a vowel in function label.

18. The assignment system of claim 16 wherein said character key is chosen as a letter appearing in a label of said given one of said identified functions.

19. The assignment system of claim 14 wherein said means for iteratively repeating is caused to operate on a substantially automated basis.

20. The assignment system of claim 14 further including means for causing an assignment made to be recorded in a database of keyboard shortcuts previously made, and means for comparing each further assignment of a keyboard shortcut for a one of said identified functions with said assignments recorded in said database, and for causing a signal to be made for any duplication of a previously assigned keyboard shortcut.

21. The assignment system of claim 14 wherein said priority order is established in an inverse relationship to a likelihood of successfully finding an acceptable keyboard shortcut assignment for a given function.

22. The assignment system of claim 14 wherein said given criterion for acceptance of a keyboard shortcut assignment includes user review of a proposed assignment.

* * * * *